United States Patent [19]

Casey

[11] 4,317,374

[45] Mar. 2, 1982

[54] COMPENSATED VANE AIRFLOW METER

[75] Inventor: Gary L. Casey, Troy, Mich.

[73] Assignee: The Bendix Corporation, Southfield, Mich.

[21] Appl. No.: 150,106

[22] Filed: May 15, 1980

[51] Int. Cl.³ .............................................. G01F 1/38
[52] U.S. Cl. .................................. 73/861.53; 123/442
[58] Field of Search .......... 73/861.53, 861.47, 861.48; 261/44 R, 50 A, 62, DIG. 52, DIG. 68; 123/336, 442

[56] References Cited

U.S. PATENT DOCUMENTS

| | | | |
|---|---|---|---|
| 2,228,733 | 1/1941 | Reichhelm et al. | 123/442 X |
| 3,078,079 | 2/1963 | Mick | 261/44 |
| 3,817,099 | 6/1974 | Bubniak et al. | 73/199 |
| 3,841,281 | 10/1974 | Mick | 123/97 B |
| 3,962,913 | 6/1976 | Jeswani | 73/118 |
| 4,022,175 | 5/1977 | Laprade et al. | 123/442 X |
| 4,058,100 | 11/1977 | Tanaka et al. | 123/139 AW |
| 4,085,723 | 4/1978 | Tanaka et al. | 123/139 AW |
| 4,089,308 | 5/1978 | Pierlot | 123/119 R |
| 4,096,838 | 6/1978 | Tanaka et al. | 123/139 AW |
| 4,121,545 | 10/1978 | Mizote | 123/32 EJ |

Primary Examiner—Jerry W. Myracle
Attorney, Agent, or Firm—Russel C. Wells

[57] ABSTRACT

An airflow sensor with a rectangularly shaped sensing vane is disclosed. The vane is pivotally mounted in a cylindrical bore perpendicular to the airflow direction of the sensor and yields an airflow signal proportional to its angular rotation. An air motor mechanically coupled to the vane maintains a constant pressure drop across the vane. The air motor assists in pivoting the vane by magnifying the force on the vane for changes in airflow. In one embodiment, a gas filled bellows modifies the positioning of the vane by the air motor to compensate for temperature and barometric variations. In another embodiment, an absolute pressure sensor, located between the vane and a throttling member, compensates for barometric changes and transient delays in the response of the vane.

8 Claims, 6 Drawing Figures

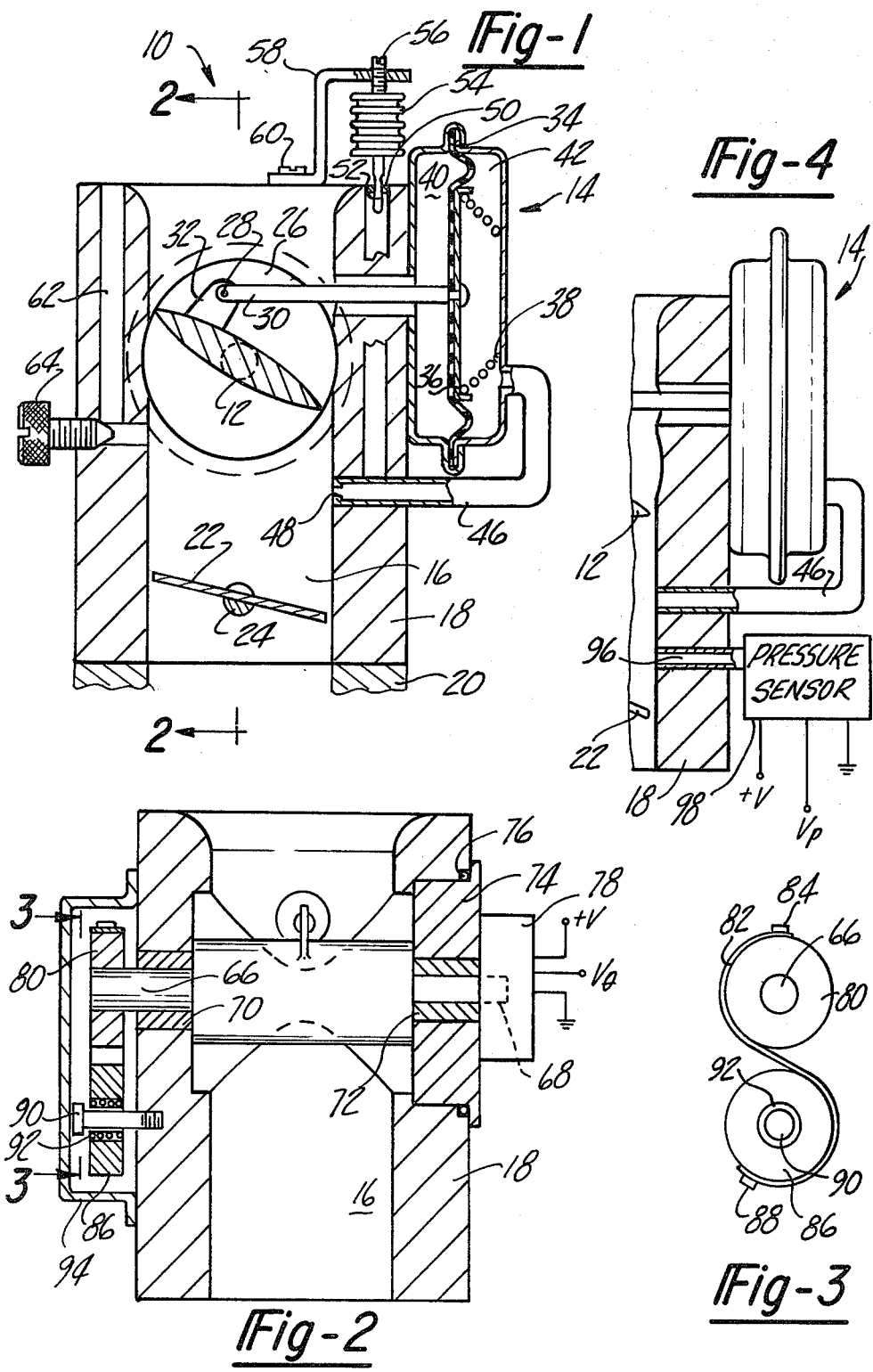

COMPENSATED VANE AIRFLOW METER

BACKGROUND OF THE INVENTION

The invention pertains generally to the measurement of the mass airflow ingested into an engine having a fuel injection system and is more particularly directed to vane-type airflow sensors for such measurements.

Automotive fuel injection systems are becoming familiar to many of the driving public today. These systems include an electronic control which regulates the air/fuel ratio of the combustion process with regard to a schedule based on the operating parameters of the engine. Generally, the mass fuel flow of an injection system is controlled with high precision by measuring the mass airflow injected into the induction tube of the engine and thereafter dividing the scheduled air/fuel ratio by the measured amount. The calculated fuel amount is then injected by conventional solenoid fuel injectors at predetermined times into the engine. However, the accuracy of the entire control process depends heavily on the precision of the mass airflow measurement.

The mass airflow inducted into an engine can be measured indirectly as has been previously accomplished in speed-density systems. In the indirect system the engine is envisioned as a constant volume pump wherein the volume of airflow is directly proportional to speed. This volume calculation is transformed into a mass airflow measurement by modifying the volume resultant for density changes in the airflow due to manifold pressure and the ambient temperature. This measurement technique has the drawback that it must be further compensated for the volumetric efficiency of the particular engine which can change with age.

Mass airflow for an automotive engine can also be measured directly, for example, by a sensor injecting ions into the airflow and calculating their transport time to a collecting electrode. Another type of direct measurement mass airflow sensor is the hot wire type wherein a wire is heated to an incandescent state and varies in resistance as a result of the amount of flow cooling the wire. Still another type of direct mass flow sensor is the impact vane configuration. These sensors include a vane or plate with an exposed surface area which is placed in the path of the airflow so that the impingement of the airflow on the surface causes a deflection against a return force which is then measurable as the amount of airflow.

An impact vane sensor is advantageous in that it is a relatively simple mechanical device for the direct measurement of airflow and is relatively accurate while being inexpensive. Further, it does not require a very high potential supply for the generation of ion currents or sensitive electronic circuits that inject current into a hot wire. More importantly, it is relatively insensitive to variations in airflow measurements due to humidity.

The vane type sensors are even more precise because of the recent advance of coupling an air motor to the vane to assist its movement during transient operations. An air motor is a mechanical device generally operating to multiply the mechanical forces of the vane during pressure differentials sensed by two input ports of the air motor. The input ports communicate to the upstream and downstream side of the vane such that if the airflow changes across the vane and thus causes a differential pressure change then the air motor will multiply the forces present and assist the movement of the vane to cancel the change in pressures. This permits the vane to rapidly follow transient operations of the throttling member of the induction tube to provide an even more accurate signal indicative of mass airflow.

One of the more perplexing problems encountered with the vane type sensor is the measurement of airflows near a zero flow. The clearance between the vane and induction tube produce an uncontrolled amount of leakage around the sensor not important at higher airflows. This unmeasured flow and the high frictional forces of most sensors produce an error at low airflows. Moreover, this error can change with the aging of the sensor in a manner difficult to predict. Intricate casting and complex dynamic balancing techniques have been considered to improve the resolution of these sensors at low airflows but are relatively expensive to implement.

It would, therefore, be highly desirable to make this already advantageous device even more favorable for use in the automotive environment by increasing its accuracy without adding to the expense of manufacture of the device. Particularly, if the sensitivity and resolution at low airflow rates could be increased, the device will become more advantageous. This is because automotive applications require highly precise air/fuel ratio metering at low engine speeds and airflow rates because of the characteristics of the engine. Specifically, at idle and low partial throttle conditions, pollution control requires accurate airflow measurement.

Additionally, the vane type airflow meters do exhibit some errors due to frictional losses, transient delays in the movement of the vane even when equipped with air motors, and density effects caused by altitude and temperature. It would, therefore, be highly desirable to compensate a vane air/flow meter for these errors in a fascile manner.

SUMMARY OF THE INVENTION

It is, therefore, the primary objective of the invention to provide an improved vane-type airflow sensor which is more accurate and less expensive than those known in the art today.

It is also an object of the invention to provide this improved accuracy by introducing a nonlinear response with the vane configuration such that the sensitivity of the sensor is increased at low airflow rates.

It is another object of the invention to increase the accuracy of the airflow sensor by providing altitude, transient delay, and frictional loss compensation to a vane airflow sensor.

It is yet another object of the invention to increase the accuracy of a vane airflow sensor by providing temperature compensation to a vane airflow sensor.

In accordance with these objects, the present invention provides an airflow sensor comprising a rectangularly shaped sensing vane pivotally mounted in a mounting bore which is perpendicularly cross positioned in the induction tube of the internal combustion engine. The vane accepts the impinging air of the induction tube and rotates to provide an angular measurement of the airflow therethrough. An air motor provides assistance in the movement of the vane by maintaining a constant pressure differential thereacross. The angular rotation of the vane is transformed into a signal indicative of airflow by means of a rotary position sensor.

The rectangular vane rotating in a cross positioned bore produces some distinct advantages for the airflow sensor. Leakage is reduced to a minimum because the vane is sealed by the mounting bore instead of the induction bore. Further, the cylindrical mounting bore is easily machined to close tolerances thus improving the accuracy of the device.

The mounting bore and rectangular vane are porportioned with respect to the induction bore such that the sensitivity of the metering is increased at low airflow rates. More particularly, a nonlinear characteristic for the sensor is desired and preferrably is logarithmic with respect to changes in angular rotation of the vane in relation to changes in airflow.

Generally, the proportioning of the vane and mounting bore to induction bore produces a substantially nonlinear characteristic with higher resolution at the lower airflow rates than at the higher. The cross sectional flow area produced by the rectangular vane intersecting the circular area of the induction bore increases more slowly at lower airflow rates and thus uses more angulation of the vane. At higher airflow rates, a smaller angular rotation of the vane will correspondingly produce larger changes in the cross sectional area and hence, more airflow.

To more advantageously tailor this nonlinear function, the flow sensor further provides means for generating airflow leakage around the vane. This leakage generating means can be set to provide a predetermined amount of the airflow to bypass the vane sensor. Since this bypassed amount is a greater percentage of the total airflow at low flows than at higher flows, the overall characteristic can be further nonlinearized in this manner. By setting the correct leakage factor at *low* airflow, a substantially logarithmic characteristic can be generated across the entire range.

Further, in one preferred embodiment the airflow sensor includes a means for compensating the airflow signal in response to altitude and transient delay errors. In the preferred form, the compensation means comprises an absolute pressure sensor located between the downstream side of the vane and the throttling member in the induction tube of the engine.

An averaging circuit is used to generate an altitude compensation signal from the absolute pressure sensor which is combined with the mass airflow signal to produce a composite compensated signal. The signal from the absolute pressure sensor is additionally differentiated to be representative of the transient delay in air valve and the frictional losses of the sensing vane. This differentiated signal is also combined with the mass airflow signal to provide another component of the composite compensated signal. Still another component is generated by a temperature sensitive means.

In another preferred embodiment, the airflow sensor includes a gas filled bellows to provide altitude and temperature compensation. The gas in the bellows expands and contracts in response to changes in temperature and altitude. The movement of the bellows is utilized to change the orifice diameter of a conduit communicating with the downstream port of the air motor. This configuration changes the constant pressure differential the vane seeks to maintain and thus the angular readout due to airflow. The differential is modified with respect to temperatures and altitude by the bellows to produce this compensation in a fascile manner.

The invention will be more fully described and better understood if a reading of the following detailed description of the preferred embodiments is undertaken in conjunction with the attached drawings wherein:

BRIEF DESCRIPTION OF THE DRAWINGS

FIG. 1 is a cross sectioned side view of a vane type airflow sensor constructed in accordance with one embodiment of the invention;

FIG. 2 is a cross sectioned front view of the vane type airflow sensor illustrated in FIG. 1;

FIG. 3 is a fragmentary front view of the constant force return mechanism of the vane type airflow sensor illustrated in FIG. 1 and FIG. 2;

FIG. 4 is a partially cross sectioned fragmentaticn side view of another embodiment of a vane type airflow sensor constructed in accordance with the invention;

DETAILED DESCRIPTION OF THE PREFERRED EMBODIMENTS

Figure 5:
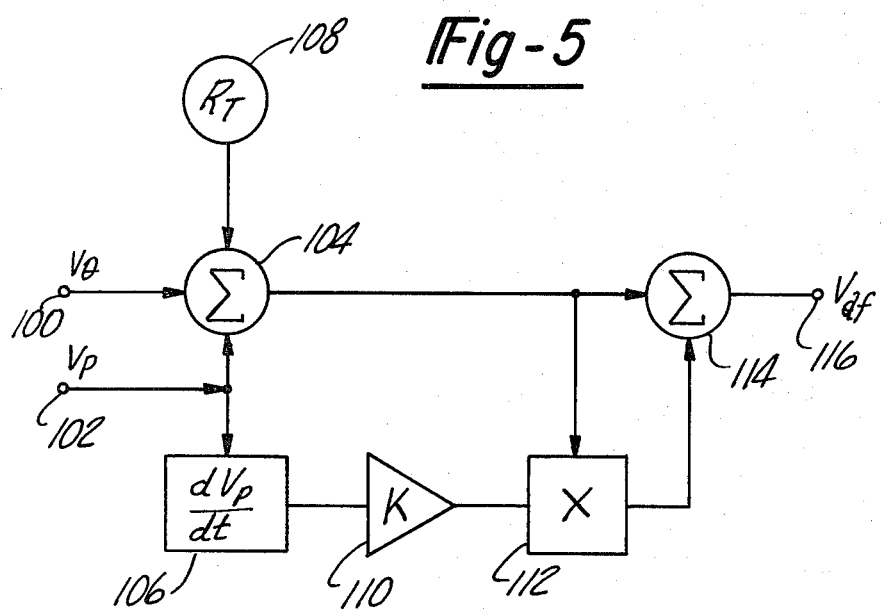
FIG. 5 is an electrical schematic block diagram of the combinational circuitry utilized for generating a total composite pressure signal from the vane type airflow sensor illustrated in FIG. 4.

In a preferred embodiment, a vane type airflow meter 10 which has been constructed in accordance with the teachings of the invention is illustrated in FIG. 1. The airflow meter 10 includes an airflow sensing vane 12 of a generally rectangular shape that is rotatable within an air induction bore 16 of a throttle body 18. In cross section the vane is contoured to form upper and lower surfaces which meet at a sharp edge. Preferably, the throttle body 18 is adapted to be mounted on an intake manifold 20 of an internal combustion engine. The internal combustion engine may further be provided with a fuel injection system or other fuel metering system that utilizes the measurement of mass airflow from the sensor.

The airflow (in the direction of the arrows) to be measured is inlet through the air induction bore 16 and is regulated by a conventional throttling mechanism including a butterfly throttle plate 22 rotatable on a throttle shaft 24. The inlet air is drawn through the induction bore and into the manifold 20 under the influence of manifold vacuum. The throttle mechanism is controlled by an operator demanding greater speed or power of the engine by opening the blade in a clockwise direction as shown in the drawing. Larger openings of the throttle plate correspond to greater airflows through the induction bore 16 for a constant manifold pressure.

The rectangular vane 12 rotates within a cylindrical mounting bore 26 which has been formed normal or perpendicular to the axis of the air induction bore and the direction of the airflow. As is seen in the drawing the mounting bore 26 has been proportioned to be slightly larger in diameter than the diameter of the induction bore 16. This proportioning sets the initial angular offset from horizontal that the vane will have at zero airflow. The initial offset is used to modify the airflow function such that from a zero flow area to a maximum flow area a smaller number of degrees of angular rotation will used. The maximum number of measurable degrees is 90 where the vane would travel from horizontal to vertical. The larger the mounting bore diameter is, with respect to the induction bore diameter, the larger the initial angular offset and the smaller the number of degrees usable to measure the flow.

According to the invention one advantage to providing an offset is that the vane is sealed at zero airflows by the clearance between the vane and the mounting bore wall. Because of the simple geometrical shapes used this configuration can produce excellent sealing properties. The indentation of the mounting bore 26 provides additional sealing of the ends of the vane 12. The accuracy of the flow sensor at low airflows can be considerably increased in this manner.

The vane 12 rotates in this mounting bore 26 by action of an air motor 14 operating because of the differential pressure caused by the airflow passing across the vane. The air motor 14 comprises two cup shaped metal sections sealing a flexible diaphragm 34 between the rolled edges thereof. The air motor is therefore divided into a first pressure chamber 40 and a second pressure chamber 42 which communicate to opposite sides of the vane 12.

The pressure chamber 40 communicates to the upstream side of vane 12 via port 44 and the second chamber 42 communicates to the downstream side of the vane via port or conduit 46. A pressure differential on either side of the diaphragm equal to that across the vane is produced by the air motor communicating with these ports.

The air motor moves the vane by having a connecting rod 30 affixed pivotally to an upstanding tab 32 on the vane by means of a pin 28. The connecting rod 30 is yoke shaped on the connecting end with forearms on either side of the tab 32 to receive pin 28. At its other end, the connecting rod 30 is pinned to the diaphragm 34 by means of a spring retainer cap 36. The retainer cap 36 further includes a peripheral lip which holds a conical spring 38 against the wall of chamber 42. The biasing spring 38 provides a force for returning the diaphragm 34 to a neutral position. The spring 36 is formed in this shape to be able to lie flat against the wall so as not to impede the movement of the connecting rod. Movement of the diaphragm because of a pressure difference in chambers 40, 42 will therefore cause movement of the vane 12.

As is better illustrated in FIG. 2, the rectangular vane is journalled to rotate on bushings 70, 72 by means of two integrally formed end shafts 66 and 68 respectively. The bushing 72 is fitted into an aperture in a sealing plate 74. The sealing plate 74 mates with a step in the mounting bore slightly larger than the cross bore 26 to form an airtight seal by means of an O-ring 76 opposed between the walls of the mounting bore and the sealing plate.

The end shaft 68 further extends into a potentiometer 78 which produces a signal V from a connection to a positive voltage +V and to ground. The end shaft 68 turns the moveable wiper of potentiometer to vary the output voltage according to its position. The signal $V_O$ is thus a linear voltage dependent upon the angle the vane makes with a reference position.

Although a resistive potentiometer of conventional construction is illustrated, any linear rotary position sensor may be used with the invention. Capacitive or inductive transducers that provide a linear voltage signal based upon angular position of a shaft are equally as advantageous.

With respect to FIGS. 2 and 3, the other end shaft 66, extending through bushing 70, has press fitted thereon a pulley 80 which has one end of a strip shaped spring 82 riveted at 84. The spring 82 wraps around the pulley 80 and is wrapped oppositely around an idler drum 88. The idler drum is free to rotate by means of a bearing 92 mounted on a stud 90 threaded into the throttle body 18. A dust cover 94 is used to protect the mechanism from the hostile automotive environment.

The strip spring 82, sometimes termed a negator spring, provides a constant restoring force for the vane 12 in the counterclockwise direction as seen in the drawing. This force does not change with the rotation angle of the vane which would change the air flow measurement capabilities of the device. The force is dependent only upon the amount of unwrapped spring which is maintained unchanged between the idler and pulley.

The airflow sensor operates by maintaining a constant pressure differential across the vane for different airflows. It can be shown that for a constant pressure differential across a restriction that an airflow is dependent only on flow area. A change in the flow area between the vane and the induction bore necessitates a positional change in the vane to maintain the differential and thus makes the angular position of the vane a measurement of the airflow. The angular position of the vane is converted directly into an electrical signal by the rotary position sensor, potentiometer 78.

The constant differential pressure is maintained by action of the air motor 14. If for instance the airflow past sensor vane 12 increases the pressure will become lower on the downstream side of the vane tending to open the vane further.

This force is multiplied by the air motor where the decreased pressure is communicated to chamber 42 and will move the connecting rod 30 by action of the diaphragm 34. The spring 38 balances the pressure in chamber 42 and sets the constant differential pressure across the vane 12. When the vane opens to a position where the set differential pressure is again equal to the pressure difference between chambers 40 and 42 the system is in equilibrium and the air motor will no longer provide an opening force.

Similarly, when the airflow decreases the pressure differential between chambers 40 and 42 decreases such that spring 38 produces a closure force on the vane 12. The vane will close to where the constant pressure differential is once more established between the upstream and downstream side of the vane.

Both the negator spring 82 and conical spring 38 set the predetermined diffential across the vane. The negator spring also functions as a anti-backlash element to remove mechanical play from the connecting rod and diaphragm assembly. The pressure differential that is set across the vane is very small relative to the manifold vacuum so that the breathing characteristics of the engine are not detrimentally affected.

The flow area, which is proportional to the airflow, relates non linearly to the angular rotation of the vane 12. Looking from the top of the induction bore into the sensor, the cross sectional flow area between the vane and the bore wall opens as the vane is rotated. The flow area increases as would an opening from a plate drawn across a circular aperature with equal openings on each side of the circle. These flat edged crescent shaped areas are very small at low airflow and increase to where they substantially meet at the center of the circle when the vane is approximately vertical. Therefore, the flow area increases faster than the angular rotation of the blade and at an increasing rate related to the curvature of the induction bore.

This means that a greater number of degrees of vane rotation are available for resolving airflows at low flow rates. According to the invention this configuration then provides more accuracy at low flow rates than at high flow rates.

This nonlinearity of the sensor at low flow rates is additionally enhanced by providing a means for bypassing a predetermined amount of airflow past the vane 12. In the embodiment shown this leakage is produced by a conduit 62 which communicates with atmospheric pressure on one side and the pressure immediately downstream of vane 12 on the other side. An adjustable needle valve 64 is threaded into the conduit for calibration purposes. The amount of airflow through the conduit 62 is substantially constant once the needle valve is adjusted because of the constant pressure differential between the upstream and downstream sides of the vane 12.

However, this constant leakage amount is a greater percentage of lower airflows than of higher airflows and modifies the nonlinear characteristic of the sensor. This correction is in the direction of making the change in airflow for changes in angular position of the vane 12 logarithmic.

Returning now to FIG. 1, the present embodiment of the airflow meter 10 also includes a means for providing temperature and altitude compensation for the airflow. In this embodiment the means for compensating the sensor comprises a restriction 48 and a restriction 50 sized relative to each other. These restrictions provide a means for changing the pressure seen by chamber 42 from that of the actual pressure on the downstream said of the vane 12. This will modify the predetermined pressure differential as seen by the vane 12.

The restriction 50 receives an elongated element 52 which changes an annular opening between the element and the orifice according to the shape of the element 52. The element 52 is connected to and moves with bellows 54 which contains a gas whose volume is pressure and temperature sensitive. The shape of element 52 can be manufactured to provide any of many different calibrations but preferably is inversely proportional to its length. The bellows is mounted near the incoming airflow by bracket 58 and a mounting screw 60. An initial positioning of the element 52 into the orifice 50 is made by adjustment screw 56.

Increases in temperature or altitude cause the bellows to elongate further and increase the opening of restriction 50. Conversely, decreases in temperature or altitude contract the element 52 to close the opening. This has the effect of increasing the constant pressure differential of the sensor for increases in altitude or temperature and decreasing the constant pressure differential for decreases. Thus when the density of the airflow increases or decreases because of these defects, the calibration of the sensor is shifted in the correct direction to compensate for the changes by changing this differential.

A second preferred embodiment of the invention is illustrated in the fragmentary illustration of FIG. 4. In this implementation the vane, air motor, leakage means and throttle body configurations have all been retained and thus have not been shown. The restrictions, Bellows, and conduit have been deleted. Instead, an absolute pressure sensor 98 communicates with the downstream side of the vane 12 and the upstream side of the throttle blade 22 via conduit 96.

The pressure sensor 98 measures the absolute pressure of this particular area and outputs a voltage $V_p$ that is linearly proportional thereto. The pressure sensor 98 can be any electronic absolute pressure sensor but preferably is a commercially available quartz capacitive pressure sensor, No. 1181874, available from the Electronic Engine Control System Group of The Bendix Corporation, Troy, Mich.

In this particular embodiment, the voltage $V_p$ and the voltage from the potentiometer $V_O$ are combined in combinational circuitry to produce an output from an electronic circuit as shown in FIG. 5. The circuit shown in block form in the figure combines a voltage $V_p$ and $V_O$ to form a composite airflow voltage signal $V_{af}$ which is compensated for temperature, altitude and transients. The composite signal can be used to calculate the air fuel rates for a fuel injection system in a manner similar to that used for $V_O$ in the first embodiment.

The combinational circuit comprises a means 104 for summing the signals $V_O$ and $V_p$ from terminals 100, 102 respectively, and further combines a temperature compensation signal with them from a temperature sensitive means 108.

Since the pressure sensor is located downstream of the vane 12 but upstream of the throttling member, it measures a pressure which on the average differs from atmospheric only by the constant pressure drop of the sensor vane. This pressure however does change proportionally with altitude and thus can be used as an indication of such. Therefore, the average value of $V_p$ is used as an altitude correction signal.

Moreover, the temperature compensation signal and altitude correction signal are linear with respect to their dependent variables. Increases in either temperature or altitude will increase their respective signals. However, density decreases with these variables and the airflow sensor will read low for increases in these variables. Thus, a simple summation with the correct scaling factors will introduce optional compensation. The output of the summation device 104 is thus a signal which is compensated for altitude variations and for temperature.

To compensate for transients the signal from the absolute pressure sensor $V_p$ is input to a differentiator 106. The differentiated output of the signal $v_p$ is multiplied by a gain factor K from an amplification device 110 and transmitted to one input of a multiplier 112. The other input to the multiplier 112 is then combined with the output of the summation device 104 in another summation device 114 to generate the composite airflow signal $V_{af}$ at terminal 116. The airflow signal $V_{af}$ is therefore a composite signal which is compensated for altitude, temperature and transient conditions.

The transient compensation is possible by this technique because the pressure changes between the vane and throttle blade when the throttle is opened. Before the air motor 14 can overcome the inertia of the vane, the pressure sensor 98 can output the pressure change to modify the airflow signal directly. The derivative function produces a lead term for compensating the airflow sensor signal until the constant differential pressure is reestablished across the vane 12.

Figure 6:
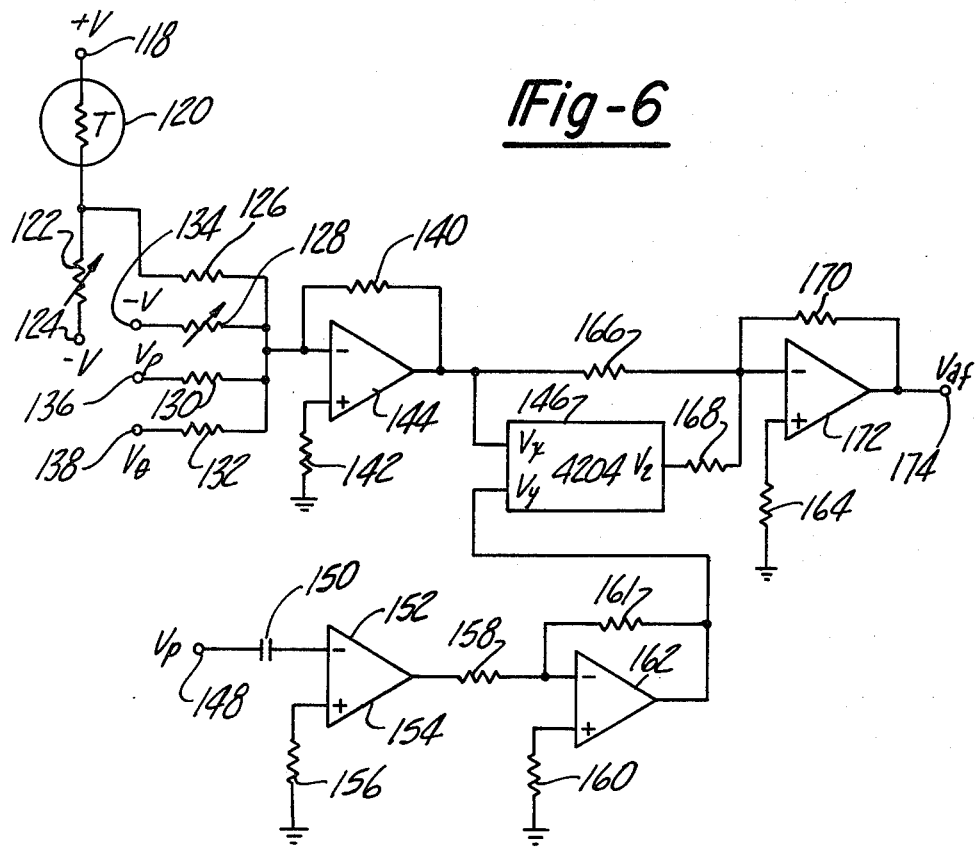
FIG. 6 is a detailed electrical schematic diagram of the combinational circuitry illustrated in FIG. 5.

A detailed schematic of the circuit for combining the outputs of the absolute pressure sensor 98 and the potentiometer 78 will now be more fully described if attention is directed to FIG. 6.

Preferably, the temperature compensation signal is developed by a divider network including a temperature sensitive resistor 120 and a variable resistor 122. The temperature sensitive resistor is positioned in the airflow and changes its resistance as ambient temperature changes. Preferably the resistor has a positive temperature coefficient. The variable resistor 122 sets the initial bias point for the temperature signal. The network is connected between terminals 118, 124 supplied with +V and −V, respectively. The output of the network, provided at the junction of resistors 120 and 122, is therefore a voltage which varies with inversely temperature.

The summation device 104 is embodied in the circuitry as an operational amplifier 144 which has a common node for algebraically summing the inputs from terminals 134, 136, 138 and the temperature signal. The common node is connected to the inverting input of the amplifier 144. Operational amplifier 144 further has a negative feedback resistor 140 connected between its inverting input and output for determining the respective gain of each input. Additionally, a resistor 142 is connected between the non-inverting input of the amplifier 144 and ground.

The signals $V_p$ and $V_O$ are input to the common node via resistors 130 and 132 respectively. A biasing voltage −V is also connected to the common node by a variable resistor 128. The variable voltage through this connection is used to provide an offset for the amplifier 144. The common terminal is further connected via an input resistor 126 to the temperature network.

The differentiator 106 is formed by an operational amplifier 154 having a capacitor 150 connected between its inverting input and terminal 148. The voltage $v_p$ from the pressure sensor is input to the terminal 148. The non-inverting input of amplifier 154 is tied to ground through resistor 156. Resistor 152 inverted between the inverting input and output is used to provide negative feedback.

Amplification for the differentiated voltage output from the amplifier 154 is provided by an operational amplifier 162 connected as an inverting voltage amplifier. The operational amplifier 162 has its non-inverting input tied to ground through resistor 160 and a feedback network consisting of resistors 161 and 158 which determine the gain of the amplifier. The resistor 158 is connected between the output of the amplifier 154 and the inverting input of the amplifier 162 while the resistor 161 is connected between the inverting input of amplifier 162 and its output.

The multiplication function for the combinational circuitry is provided by an four quadrant analog multiplier 146. The transfer function for the multiplier is $Vx \times Vy = Vz$. The output of the amplifier 144 is connected to the Vx input and the output of the amplifier 162 is connected to the Vy input. The resultant output Vz is the multiplicative product of the two signals provided at the inputs. The multiplier 146 is commercially available as a No. 4204 from the Burr-Brown Corporation of San Diego, Calif.

The second summation device 114 is comprised of an operational amplifier 172 connected as an analog summer. The non-inverting input of the operational amplifier is tied to ground through resistor 164. A feedback resistor 170 is connected between its output and its non-inverting input. Further, at the non-inverting input of the amplifier 172 is a node that algebraically sums the signal transmitted through resistor 166 with that transmitted through a resistor 168. The signal developed through resistor 166 is transmitted as the output of the amplifier 144 while the signal developed through resistor 168 is the output of the multiplier Vz. The output of the operational amplifier 172 is therefor the compensated airflow voltage $V_{af}$ and is output from terminal 174.

While the preferred embodiments of the invention have been shown and described, it will be obvious to those skilled in the art that various modifications and variations may be made thereto without departing from the spirit and scope of the invention as defined in the appended claims.

What is claimed as having an exclusive right therein is:

1. An improved airflow sensor of the vane type which indicates the airflow through an induction tube by the position of the vane, said sensor comprising:
   a cylindrical air induction tube having an inlet end and an outlet end;
   a rectangularly shaped airflow vane positioned between said inlet end and said throttling means, said vane mounted in a cylindrical mounting bore which is normal to said air induction bore and wherein the mounting bore is of a greater diameter than said induction bore, said vane rotatable in said mounting bore against a return force by the airflow through the induction bore such that the angle of rotation of the vane is a non-linearly proportional to the amount of airflow through the induction tube; and
   an air motor for rotating said vane to maintain a substantially constant differential pressure across the vane.

2. An improved airflow sensor as defined in claim 1 further including:
   means for compensating said airflow sensor for transient delay.

3. An improved airflow sensor as defined in claims 1 or 2 further including:
   means for compensating said airflow sensor for altitude variations.

4. An improved airflow sensor as defined in claim 3 wherein said means for compensating said airflow sensor includes:
   means for generating an absolute pressure signal indicative of the absolute pressure between said vane and said throttling means; and
   means for combining said airflow signal and said absolute pressure signal into a composite airflow signal.

5. An improved airflow sensor as defined in claim 4 including:
   means for averaging said absolute pressure signal to provide an indication of barometric pressure.

6. An improved airflow sensor as defined in claim 5 including:
   means for differentiating said absolute pressure signal to provide an indication of the transient delay of said vane in measuring airflow.

7. An improved airflow sensor as defined in claims 1, or 2 further including:
   means for compensating said airflow sensor for ambient temperature variations.

8. An airflow sensor comprising:
   a cylindrical induction tube having an inlet end and an outlet end for passing an airflow which is to be measured through;

a throttling means disposed between said inlet end and said outlet end of the induction tube for regulating the amount of airflow through the tube;

a vane rotatable in said induction tube upstream of said throttling means;

means for actuating said vane in response to pressure differences upstream and downstream of the vane to maintain a substantial constant difference in pressure across the vane including an actuator body having a first pressure chamber and a second pressure chamber, means separating said pressure chambers and moving in response to a pressure difference between said pressure chambers, said moveable means operably coupled to said vane, means for communicating pressure to one of said chambers from the upstream side of said vane and for communicating pressure to the other chamber from the downstream side of said vane;

a gas filled bellows having a member moveable with changes in ambient pressure and temperature; and means cooperating with said member of said bellows to change the pressure in said downstream pressure means in response to movement of said element.

* * * * *